United States Patent
Chen et al.

(10) Patent No.: US 11,212,781 B2
(45) Date of Patent: Dec. 28, 2021

(54) PARAMETER CONFIGURATION METHOD, TERMINAL DEVICE, NETWORK SIDE DEVICE, AND COMMUNICATIONS SYSTEM

(71) Applicant: HUAWEI TECHNOLOGIES CO., LTD., Guangdong (CN)

(72) Inventors: Yan Chen, Shanghai (CN); Yiqun Wu, Shanghai (CN); Xiuqiang Xu, Shanghai (CN); Lei Wang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/712,716

(22) Filed: Dec. 12, 2019

(65) Prior Publication Data
US 2020/0120658 A1  Apr. 16, 2020

Related U.S. Application Data

(63) Continuation of application No. PCT/CN2018/091181, filed on Jun. 14, 2018.

(30) Foreign Application Priority Data

Jun. 14, 2017 (CN) .......................... 201710448508.1

(51) Int. Cl.
*H04W 72/04* (2009.01)
*H04L 1/00* (2006.01)

(52) U.S. Cl.
CPC ....... *H04W 72/0406* (2013.01); *H04L 1/0004* (2013.01); *H04W 72/0446* (2013.01)

(58) Field of Classification Search
CPC ........... H04W 72/0446; H04W 72/042; H04W 72/1205; H04W 72/1289; H04W 52/325;
(Continued)

(56) References Cited

U.S. PATENT DOCUMENTS

2016/0073354 A1   3/2016 Seo et al.
2017/0142704 A1*  5/2017 Jung ................. H04W 72/0446
(Continued)

FOREIGN PATENT DOCUMENTS

CN   102740468 A   10/2012
CN   103379628 A   10/2013
(Continued)

OTHER PUBLICATIONS

LG Electronics:"Discussion on multiplexing of eMBB and URLLC for uplink", 3GPP TSG RAN WG1 Meeting #88, R1-1702489, Athens, Greece Feb. 13-17, 2017. total 4 pages.
(Continued)

*Primary Examiner* — Jung Liu
(74) *Attorney, Agent, or Firm* — Womble Bond Dickinson (US) LLP

(57) ABSTRACT

A parameter configuration method, a terminal device, a network side device, and a communications system are disclosed. The method includes: determining, by a network side device, a first transmission parameter and a second transmission parameter for a terminal device when the network side device needs to allocate a first-type transmission resource and a second-type transmission resource to the terminal device, where the first transmission parameter and the second transmission parameter meet a preset correspondence; generating, by the network side device, control information, where the control information includes first information, and the first information is used to indicate the first transmission parameter; and sending, by the network side device, the control information.

18 Claims, 5 Drawing Sheets

(58) Field of Classification Search
CPC ............. H04W 72/048; H04L 27/2601; H04L 1/1861; H04L 5/0092; H04L 5/1469; H04L 5/0055; H04L 5/0051; H04L 27/3488; H04L 5/0037
See application file for complete search history.

(56) References Cited

U.S. PATENT DOCUMENTS

| | | | |
|---|---|---|---|
| 2017/0310431 A1* | 10/2017 | Iyer ..................... | H04L 1/1819 |
| 2017/0332396 A1* | 11/2017 | Liao .................. | H04W 72/0446 |
| 2017/0359807 A1* | 12/2017 | Hong ................. | H04L 27/3488 |
| 2018/0184444 A1* | 6/2018 | Li ....................... | H04W 72/0406 |
| 2018/0270816 A1* | 9/2018 | Li ....................... | H04W 72/048 |
| 2019/0014576 A1* | 1/2019 | Liao ...................... | H04L 5/0092 |
| 2019/0110316 A1* | 4/2019 | Takeda ................. | H04W 74/085 |
| 2019/0116007 A1* | 4/2019 | Yi .......................... | H04W 56/00 |
| 2019/0165894 A1* | 5/2019 | Choi ...................... | H04B 17/24 |
| 2019/0165906 A1* | 5/2019 | Bala .................... | H04L 27/3488 |
| 2019/0174440 A1* | 6/2019 | Kwak .................. | H04W 56/001 |
| 2020/0022112 A1* | 1/2020 | Yasukawa .......... | H04W 72/0413 |
| 2020/0022115 A1* | 1/2020 | Park ..................... | H04W 72/042 |
| 2020/0169375 A1* | 5/2020 | Yi .............................. | H04L 5/001 |
| 2020/0228240 A1* | 7/2020 | Hong .................... | H04L 1/0068 |
| 2021/0120510 A1* | 4/2021 | Kwak ..................... | H04L 25/00 |

FOREIGN PATENT DOCUMENTS

| | | |
|---|---|---|
| CN | 106788897 A | 5/2017 |
| CN | 106793112 A | 5/2017 |
| EP | 2680651 A1 | 1/2014 |
| WO | 2016040290 A1 | 3/2016 |

OTHER PUBLICATIONS

Asustek, "Discussion on resouice allocation of two downlink short TTI lengths", 3GPP TSG-RAN WG1 Meeting # 88 R1-1702376, Feb. 17, 2017, total 3 pages.

3GPP TSG RAN WG1 NR Ad Hoc Meeting,R1-1700051,Discussion on transmission parameter sets,Huawei, HiSilicon, Spokane, USA, Jan. 16-20, 2017,total 3 pages.

* cited by examiner

PARAMETER CONFIGURATION METHOD, TERMINAL DEVICE, NETWORK SIDE DEVICE, AND COMMUNICATIONS SYSTEM

CROSS-REFERENCE TO RELATED APPLICATIONS

This application is a continuation of International Application No. PCT/CN2018/091181, filed on Jun. 14, 2018, which claims priority to Chinese Patent Application No. 201710448508.1, filed on Jun. 14, 2017. The disclosures of the aforementioned applications are hereby incorporated by reference in their entireties.

TECHNICAL FIELD

The present disclosure relates to the communications field, and more specifically, to a parameter configuration method, a terminal device, a network side device, and a communications system.

BACKGROUND

A 5G network supports a plurality of services, for example, an enhanced mobile broadband (eMBB) service and an ultra-reliable and low-latency communications (URLLC) service. The eMBB service is usually high-speed transmission of a large data packet (such as a video), and a latency is required to be 5 ms to 10 ms. The URLLC service is usually transmission of a small packet (such as an instruction in automatic driving and industrial control), and has requirements for extremely high reliability and extremely low latency. Therefore, in 5G air interface design, parameters such as frame structures, subcarrier spacings, and transmission time intervals (TTI) used by the two services are also different. For example, as shown in FIG. 1, a 1 ms subframe length, a 15 kHz subcarrier spacing, and a 1 ms TTI length are usually used for the eMBB service, and each subframe includes 14 symbols. For the URLLC service, a 60 kHz subcarrier spacing is used to reduce a time occupied by each symbol. During service scheduling, a data scheduling latency of the URLLC service may be further shortened by reducing a quantity of symbols in each subframe. For example, each subframe includes seven symbols. Therefore, the eMBB service may be simultaneously scheduled to be transmitted on resources including two different TTIs. When the service is transmitted on resources including two different TTIs, different transmission parameters may be used. However, in the prior art, there is no solution to configuring parameters for transmitting a service on two different types of resources.

SUMMARY

In view of this, the present disclosure provides a parameter configuration method, a terminal device, a network side device, and a communications system, to configure, for a user, transmission parameters used to perform communication on resources corresponding to two different TTIs.

According to a first aspect, a parameter configuration method is provided. The method includes: receiving, by a terminal device, control information, where the control information includes first information, the first information is used to indicate a first transmission parameter, and the first transmission parameter is a transmission parameter that needs to be used by the terminal device to perform communication on an allocated first-type transmission resource; determining, by the terminal device, a second transmission parameter based on a pre-stored correspondence met by the first transmission parameter and the second transmission parameter and the first transmission parameter indicated by the first information, where the second transmission parameter is a transmission parameter that needs to be used by the terminal device to perform communication on an allocated second-type transmission resource, and a transmission time interval TTI corresponding to the first-type transmission resource is different from a TTI corresponding to the second-type transmission resource.

In the method according to the first aspect, the control information does not need to indicate both the first transmission parameter and the second transmission parameter, and needs to indicate only one of the first transmission parameter and the second transmission parameter. This effectively reduces overheads of the control information.

According to the first aspect, in a first embodiment of the parameter configuration method, the control information further includes second information, and the second information is used to indicate the allocated first-type transmission resource and the allocated second-type transmission resource; and the method further includes: determining, by the terminal device, the allocated first-type transmission resource and the allocated second-type transmission resource based on the second information.

According to a second aspect, a parameter configuration method is provided. The method includes: determining, by a network side device, a first transmission parameter and a second transmission parameter for a terminal device when the network side device needs to allocate a first-type transmission resource and a second-type transmission resource to the terminal device, where a transmission time interval TTI corresponding to the first-type transmission resource is different from a TTI corresponding to the second-type transmission resource, the first transmission parameter is a transmission parameter that needs to be used by the terminal device to perform communication on the first-type transmission resource, and the second transmission parameter is a transmission parameter that needs to be used by the terminal device to perform communication on the second-type transmission resource; and the first transmission parameter and the second transmission parameter meet a preset correspondence; generating, by the network side device, control information, where the control information includes first information, and the first information is used to indicate the first transmission parameter or the second transmission parameter; and sending, by the network side device, the control information.

In the method according to the second aspect, the control information does not need to indicate both the first transmission parameter and the second transmission parameter, and needs to indicate only one of the first transmission parameter and the second transmission parameter. This effectively reduces overheads of the control information.

According to the second aspect, in a first embodiment of the parameter configuration method, the control information further includes second information, and the second information is used to indicate the allocated first-type transmission resource and the allocated second-type transmission resource.

According to the first aspect, the first implementation of the first aspect, the second aspect, or the first implementation of the second aspect, in another embodiment, the first transmission parameter includes a first modulation and coding scheme MCS, the second transmission parameter includes a second MCS, and the preset correspondence includes a correspondence between the first MCS and the second MCS. Therefore, overheads of the MCS in the control information can be reduced.

According to any one of the first aspect, the second aspect, or the foregoing implementations, in another embodiment, the first transmission parameter includes a first power parameter, the second transmission parameter includes a second power parameter, and the preset correspondence further includes a correspondence between the first power parameter and the second power parameter. Therefore, overheads of the power parameter in the control information can be reduced.

According to any one of the first aspect, the second aspect, or the foregoing implementations, in another embodiment, a granularity of the transmission time interval TTI corresponding to the first-type transmission resource is a first TTI, a granularity of the TTI corresponding to the second-type transmission resource is a second TTI, the first TTI is greater than the second TTI, and a time domain resource in the second-type transmission resource is a subset of at least one time domain resource in the first-type transmission resource. Further, the control information further includes third information, and the third information is used to indicate a quantity of second TTIs corresponding to the second-type transmission resource allocated in one first TTI; and the preset correspondence includes a correspondence between the first transmission parameter, the second transmission parameter, and the quantity of the second TTIs. Therefore, overheads of the control information required for scheduling by using the second TTI can be further reduced. Further, the quantity of the second TTIs is specifically a corresponding TTI bundling quantity when data is transmitted in a slot bundling manner.

According to any one of the first aspect, the second aspect, or the foregoing implementations, in another embodiment, the first information is specifically an index of the first transmission parameter or an index of the second transmission parameter. A specific transmission parameter is replaced with an index of a parameter, so that the overheads of the control information can be further reduced.

Correspondingly, the correspondence between the first transmission parameter, the second transmission parameter, and the quantity of the second TTIs is specifically a correspondence between the index of the first transmission parameter, an index of the second transmission parameter, and the quantity of the second TTIs; or the correspondence between the first transmission parameter, the second transmission parameter, and the quantity of the second TTIs is specifically a correspondence between the index of the first transmission parameter, an index of the second transmission parameter, and an index increment, where the index increment is determined based on the quantity of the second TTIs.

According to any one of the first aspect, the second aspect, or the foregoing implementations, in another embodiment, the control information further includes fourth information, and the fourth information is used to indicate a transmission mode that needs to be used when data is transmitted on the second-type transmission resource.

According to any one of the first aspect, the second aspect, or the foregoing implementations, in another embodiment, when a frequency domain resource in the allocated first-type transmission resource is adjacent to a frequency domain resource in the allocated second-type transmission resource, the second information is specifically used to indicate a start position of total frequency domain resources corresponding to the two types of transmission resources and a quantity of the total frequency domain resources; or the second information is specifically used to indicate a start position and an end position of total frequency domain resources corresponding to the two types of transmission resources. This can further reduce the overheads of the control information. The terminal device may further learn of a demarcation position of the first-type transmission resource and the second-type transmission resource in advance. Therefore, the terminal device may determine the frequency domain resources in the first-type transmission resource and the second-type transmission resource based on the demarcation position and the total frequency domain resources that correspond to the two types of transmission resources that are learned of by using the second information. If the terminal device knows the demarcation position, and the frequency domain resources indicated by the second information cross two types of TTI granularities, the terminal device may determine that the network side device configures transmission resources of two types of TTI granularities for the terminal device. Another transmission parameter may be determined based on the transmission parameter indicated by the first information and the correspondence. In this embodiment, no additional information needs to be added to indicate when the network side device configures the two types of transmission resources, and the terminal device may perform automatic identification, thereby further reducing the overheads of the control information.

According to a third aspect, a parameter configuration method is provided. A difference between the third aspect and the first aspect or the second aspect lies in that the first information may indicate both the first transmission parameter and the second transmission parameter, but does not indicate the quantity of the second TTIs used for transmitting data. The first transmission parameter, the second transmission parameter, and the quantity of the second TTIs meet a preset correspondence. Therefore, the quantity of the second TTIs may be determined based on the first transmission parameter and the second transmission parameter.

According to a fourth aspect, a parameter configuration method is provided. A difference between the fourth aspect and the first aspect or the second aspect lies in that, in addition to the correspondence between the first transmission parameter and the second transmission parameter, the preset correspondence may further include a correspondence between one of the first transmission parameter and the second transmission parameter, and the quantity of the second TTIs. Therefore, the control information may indicate only one of the first transmission parameter and the second transmission parameter, that is, the quantity of the second TTIs and one transmission parameter that is not indicated can be determined based on the foregoing two correspondences. This further reduces overheads of the control information.

According to a fifth aspect, a terminal device is provided. The terminal device includes a processor and a transceiver. The transceiver is configured to receive control information, where the control information includes first information, the first information is used to indicate a first transmission parameter, and the first transmission parameter is a transmission parameter that needs to be used by the terminal device to perform communication on an allocated first-type transmission resource; and the processor is configured to determine a second transmission parameter based on a pre-stored correspondence met by the first transmission parameter and the second transmission parameter and the first transmission parameter indicated by the first information, where the second transmission parameter is a transmission parameter that needs to be used by the terminal device to perform communication on an allocated second-type transmission resource, and a transmission time interval TTI corresponding to the first-type transmission resource is different from a TTI corresponding to the second-type transmission resource. The control information does not need to indicate both the first transmission parameter and the second transmission parameter, and needs to indicate only one of the first transmission parameter and the second transmission parameter. This effectively reduces overheads of the control information.

According to a sixth aspect, a network side device is provided. The network side device includes a processor and a transceiver. The processor is configured to determine a first transmission parameter and a second transmission parameter for a terminal device when needing to allocate a first-type transmission resource and a second-type transmission resource to the terminal device, where a transmission time interval TTI corresponding to the first-type transmission resource is different from a TTI corresponding to the second-type transmission resource, the first transmission parameter is a transmission parameter that needs to be used by the terminal device to perform communication on the first-type transmission resource, and the second transmission parameter is a transmission parameter that needs to be used by the terminal device to perform communication on the second-type transmission resource; the first transmission parameter and the second transmission parameter meet a preset correspondence; the processor is further configured to generate control information, where the control information includes first information, and the first information is used to indicate the first transmission parameter or the second transmission parameter; and the transceiver is configured to send the control information. The control information does not need to indicate both the first transmission parameter and the second transmission parameter, and needs to indicate only one of the first transmission parameter and the second transmission parameter. This effectively reduces overheads of the control information.

According to another aspect of the present disclosure, a chip is provided. The chip is configured to receive control information, where the control information includes first information, and the first information is used to indicate a first transmission parameter; the chip determines the first transmission parameter indicated by the first information, the first transmission parameter is a transmission parameter that needs to be used by the terminal device to perform communication on an allocated first-type transmission resource; the chip is further configured to determine a second transmission parameter based on a pre-stored correspondence met by the first transmission parameter and the second transmission parameter and the first transmission parameter indicated by the first information, where the second transmission parameter is a transmission parameter that needs to be used by the terminal device to perform communication on an allocated second-type transmission resource, and a transmission time interval TTI corresponding to the first-type transmission resource is different from a TTI corresponding to the second-type transmission resource. The control information does not need to indicate both the first transmission parameter and the second transmission parameter, and needs to indicate only one of the first transmission parameter and the second transmission parameter. This effectively reduces overheads of the control information.

According to another aspect of the present disclosure, a chip is provided. The chip is configured to determine a first transmission parameter and a second transmission parameter for a terminal device when needing to allocate a first-type transmission resource and a second-type transmission resource to the terminal device, where a transmission time interval TTI corresponding to the first-type transmission resource is different from a TTI corresponding to the second-type transmission resource, the first transmission parameter is a transmission parameter that needs to be used by the terminal device to perform communication on the first-type transmission resource, and the second transmission parameter is a transmission parameter that needs to be used by the terminal device to perform communication on the second-type transmission resource; and the first transmission parameter and the second transmission parameter meet a preset correspondence. The chip is further configured to generate control information, where the control information includes first information, and the first information is used to indicate the first transmission parameter or the second transmission parameter. The chip is further configured to output the control information. The control information does not need to indicate both the first transmission parameter and the second transmission parameter, and needs to indicate only one of the first transmission parameter and the second transmission parameter. This effectively reduces overheads of the control information.

According to another aspect of the present disclosure, a communications system is provided. The system includes the terminal device according to the fifth aspect and the network side device according to the sixth aspect.

According to another aspect of the present disclosure, a computer-readable storage medium is provided. The computer-readable storage medium stores a computer software instruction used by the terminal device according to the fifth aspect, and when the computer software instruction is run on a computer, the computer is enabled to perform the methods according to the foregoing aspects.

According to another aspect of the present disclosure, a computer-readable storage medium is provided. The computer-readable storage medium stores a computer software instruction used by the network side device according to the sixth aspect, and when the computer software instruction is run on a computer, the computer is enabled to perform the methods according to the foregoing aspects.

DESCRIPTION OF EMBODIMENTS

The following describes the technical solutions in embodiments of the present disclosure with reference to the accompanying drawings in the embodiments of the present disclosure.

A network architecture and a service scenario described in the embodiments of the present disclosure are intended to describe the technical solutions in the embodiments of the present disclosure more clearly, and do not constitute a limitation on the technical solutions provided in the embodiments of the present disclosure. A person of ordinary skill in the art may know that with evolution of the network architecture and emergence of new service scenarios, the technical solutions provided in the embodiments of the present disclosure are also applicable to similar technical problems.

Figure 2:
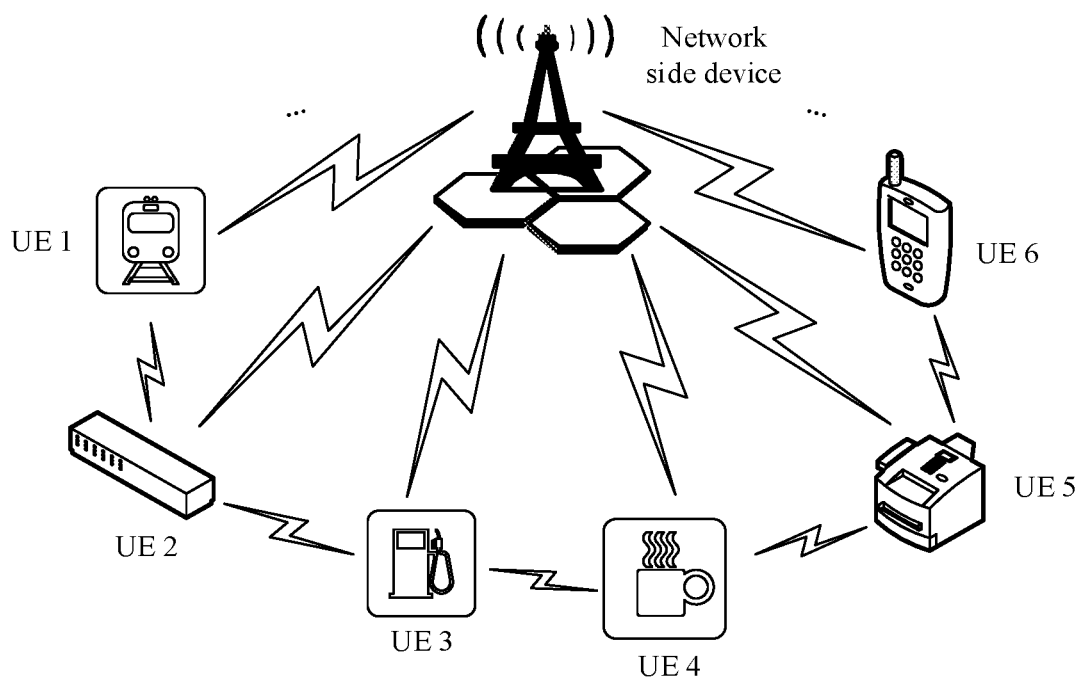
FIG. 2 is an example schematic diagram of a communications system according to an embodiment of the present disclosure.

The technical solutions described in the embodiments of the present disclosure may be applied to a communications system. The communications system may include one or more network side devices and one or more terminal devices communicating with each network side device. FIG. 2 is an example of the communications system. The communications system shown in FIG. 2 includes one network side device and a plurality of terminal devices (UE 1 to UE 6 that are shown in FIG. 2) communicating with the network side device.

The terminal devices in the present disclosure may be various handheld devices, vehicle-mounted devices, wearable devices, computing devices, or control devices that have a wireless communication function, or other processing devices connected to a wireless modem, and various forms of user equipment (UE), mobile stations (MS), terminals, terminal devices, or the like.

The network side device in the present disclosure includes a base station (BS), a network controller, a mobile switching center, or the like. An apparatus that directly communicates with user equipment through a radio channel is usually a base station. The base station may include various forms of macro base stations, micro base stations, relay nodes, access points, remote radio units (RRU), or the like. Certainly, the apparatus that performs wireless communication with the user equipment may be another network side device that has a wireless communication function. This is not uniquely limited in the present disclosure. In different systems, a device having a base station function may have different names. For example, in an LTE network, the device is referred to as an evolved NodeB (eNB or eNodeB), and in a third generation (3rd generation) network, the device is referred to as a NodeB. Alternatively, the network side device may be a network side device in a future 5G network or a network device in a future evolved public land mobile network (Public Land Mobile Network, PLMN).

When a user is scheduled to transmit a service on transmission resources corresponding to two different TTIs, for the transmission resources corresponding to two TTI granularities, two pieces of downlink control information (DCI) may be used to indicate allocated transmission resources respectively. In other words, each piece of DCI correspondingly indicates a transmission resource corresponding to one TTI granularity. In the embodiments of the present disclosure, the transmission resource includes at least one of a time domain resource, a frequency domain resource, and a time-frequency resource.

Figure 1:
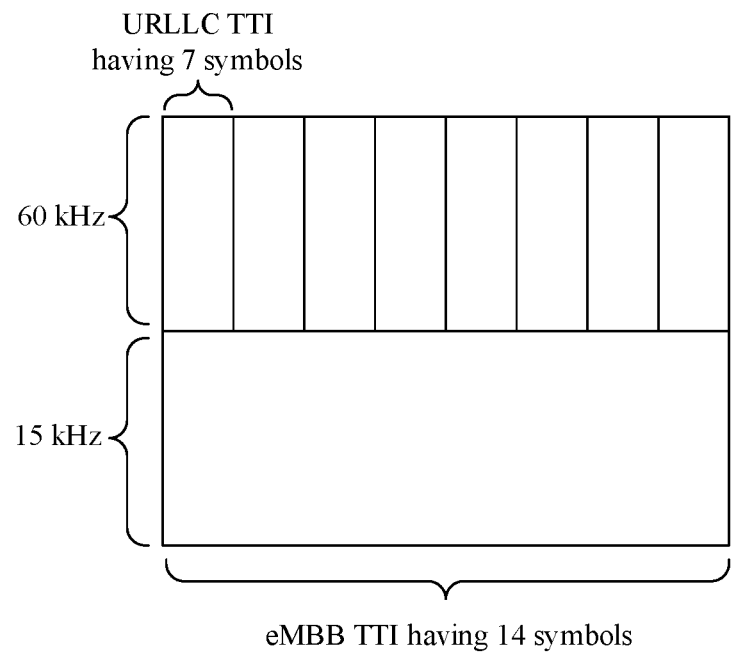
FIG. 1 is an example schematic resource diagram of resources that correspond to two types of TTIs and on which a same user is scheduled.

As shown in FIG. 1, there is a first-type transmission resource and a second-type transmission resource in a system. In the first-type transmission resource, a subcarrier spacing is 15 kHz, and a corresponding TTI is a TTI 1. In the second-type transmission resource, a subcarrier spacing is 60 kHz, and a corresponding TTI is a TTI 2.

For the first-type transmission resource, DCI 1 may be used to indicate information such as an allocated transmission resource and a modulation and coding scheme (MCS).

For the second-type transmission resource, DCI 2 may be used to indicate information such as an allocated transmission resource and an MCS.

The network side device may schedule the terminal device to transmit a service on both the first-type transmission resource and the second-type transmission resource within a time period. In this case, the network side device needs to use two pieces of DCI (for example, the DCI 1 and the DCI 2) to notify the terminal device of related information of the first-type transmission resource and the second-type transmission resource that are allocated to the terminal device, and transmission parameters that need to be used when the service is transmitted on the two types of resources.

For the foregoing manner in which two pieces of DCI are used to indicate the allocated transmission resources and the corresponding transmission parameters, overheads of control information are relatively high.

Alternatively, when the user is scheduled to transmit the service on the transmission resources corresponding to two different TTI granularities, one piece of DCI may alternatively be used to indicate allocated transmission resources corresponding to the two different TTI granularities. The DCI may indicate information such as the transmission resource corresponding to the TTI 1, the modulation and coding scheme corresponding to the TTI 1, the transmission resource corresponding to the TTI 2, and the modulation and coding scheme corresponding to the TTI 2. However, an existing DCI format needs to be greatly changed, and the overheads of the control information are still relatively high.

Figure 3:
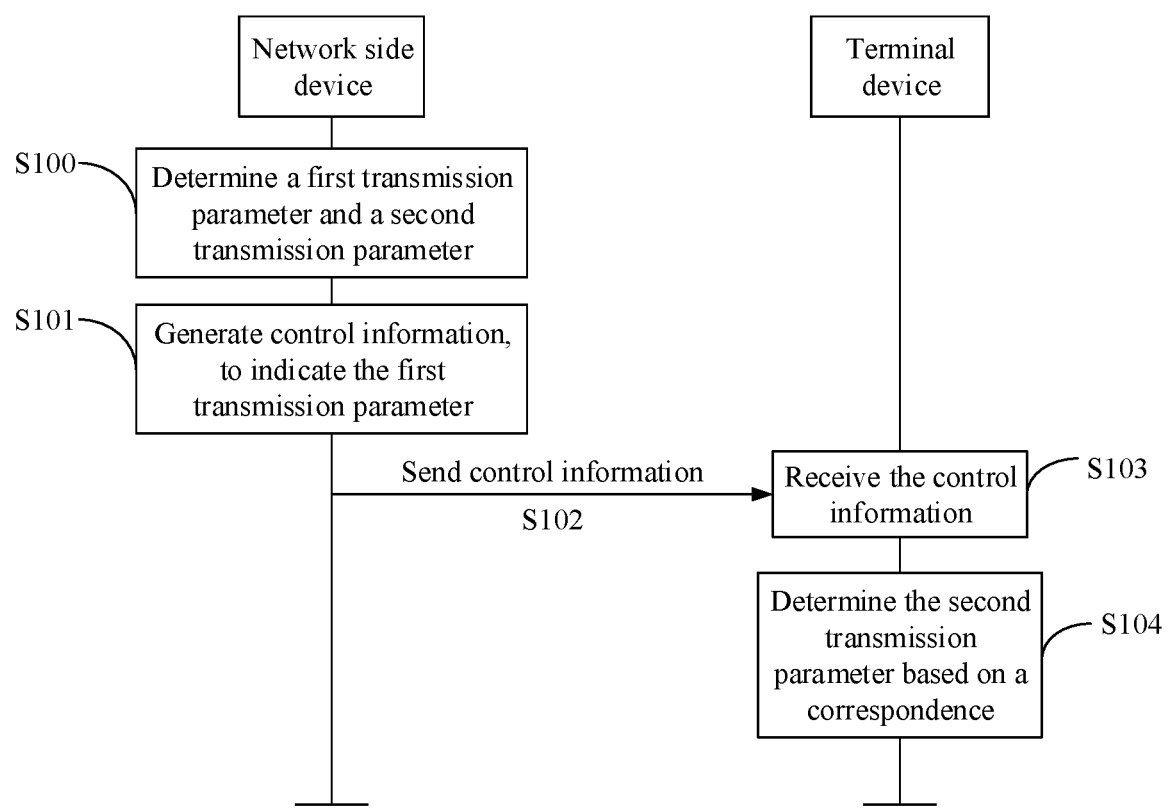
FIG. 3 is an example flowchart of a parameter configuration method according to an embodiment of the present disclosure.

To reduce the overheads of the control information, the following provides a parameter configuration method. The following describes the parameter configuration method provided in an embodiment of the present disclosure in detail with reference to the accompanying drawings. As shown in FIG. 3, the method includes the following operations.

Operation S100. A network side device determines a first transmission parameter and a second transmission parameter for a terminal device when the network side device needs to allocate a first-type transmission resource and a second-type transmission resource to the terminal device.

A transmission time interval TTI corresponding to the first-type transmission resource is different from a TTI corresponding to the second-type transmission resource. The first transmission parameter is a transmission parameter that needs to be used by the terminal device to perform communication on the first-type transmission resource, and the second transmission parameter is a transmission parameter that needs to be used by the terminal device to perform communication on the second-type transmission resource; and the first transmission parameter and the second transmission parameter meet a preset correspondence.

In the embodiments of the present disclosure, a granularity of the TTI corresponding to the first-type transmission resource is a first TTI, and a granularity of the TTI corresponding to the second-type transmission resource is a second TTI.

An example in which an eMBB service is transmitted by using the first TTI, and a URLLC service is transmitted by using the second TTI is used for description. In the embodiments of the present disclosure, that the first TTI is greater than the second TTI is used as an example for description. It may be understood that this is merely an example. A person of ordinary skill in the art may understand that the technical solutions provided in the embodiments of the present disclosure are applicable to any scenario in which data is scheduled by using two different TTIs at the same time. As shown in FIG. 1, a subcarrier spacing used during transmission of an URLLC service is 60 kHz, a corresponding symbol length is a reciprocal of the subcarrier spacing 60 kHz, and each used subframe (the second TTI) includes seven symbols. A subcarrier spacing used during transmission of an eMBB service is 15 kHz, a corresponding symbol length is a reciprocal of the subcarrier spacing 15 kHz, and each used subframe (the first TTI) includes 14 symbols. Therefore, a length of the first TTI is eight times a length of the second TTI.

The network side device may allocate both the first-type transmission resource and the second-type transmission resource to an eMBB service user, and the eMBB service user may use both the two types of transmission resources to transmit data. When allocating both the first-type transmission resource and the second-type transmission resource to the eMBB user, the network side device further needs to determine transmission parameters that need to be used for the eMBB user when the eMBB user transmits data on the two types of resources. Data transmission herein may be that the network side device sends downlink data to the terminal device, or may be that the terminal device sends uplink data to the network side device.

Operation S101. The network side device generates control information, where the control information includes first information, and the first information is used to indicate the first transmission parameter.

Operation S102. The network device sends the control information.

Operation S103. The terminal device receives the control information.

Operation S104. The terminal device determines the second transmission parameter based on a pre-stored correspondence met by the first transmission parameter and the second transmission parameter and the first transmission parameter indicated by the first information.

It should be noted that the first information may alternatively indicate the second transmission parameter, and the terminal device determines the first transmission parameter based on the correspondence and the second transmission parameter indicated by the first information. The first information needs to indicate only one of the first transmission parameter and the second transmission parameter, so that the terminal device can calculate the other transmission parameter based on the correspondence.

In an embodiment, the correspondence stored by the terminal device is the same as the correspondence based on which the network side device determines the first transmission parameter and the second transmission parameter.

The first transmission parameter should be used by the terminal device when the terminal device performs communication on the first-type transmission resource, and the second transmission parameter should be used by the terminal device when the terminal device performs communication on the second-type transmission resource.

In an embodiment, the first information is specifically an index of the first transmission parameter or an index of the second transmission parameter. Replacing a specific transmission parameter with an index of the parameter can further reduce the overheads of the control information.

The correspondence between the first transmission parameter and the second transmission parameter may be specifically a relational expression, for example, may be a relational expression between the index of the first transmission parameter and the index of the second transmission parameter, or may be specifically a correspondence table, for example, may be a table of correspondences between the indexes of the first transmission parameters and the indexes of the second transmission parameters.

In an embodiment, the first transmission parameter may include a first modulation and coding scheme MCS, the second transmission parameter may include a second MCS, and the preset correspondence includes a correspondence between the first MCS and the second MCS. Therefore, overheads of the MCS in the control information can be reduced. For example, the correspondence may be specifically a relational expression between an index of the first MCS and an index of the second MCS, and if one of the index of the first MCS index and the index of the second MCS is known, the other one may be calculated by using the relational expression. For example, the correspondence may alternatively be a table of correspondences between the indexes of the first MCSs and the indexes of the second MCSs, where values of the indexes of the first MCSs and the indexes of the second MCSs correspond to each other. If the first information indicates one of the index of the first MCS and the index of the second MCS, the other one may be obtained by looking up the table.

In an embodiment, the first transmission parameter may further include a first power parameter, the second transmission parameter may further include a second power parameter, and the preset correspondence further includes a correspondence between the first power parameter and the second power parameter. Therefore, overheads of the power parameter in the control information can be reduced. For example, the correspondence may be specifically a relational expression between an index of the first power parameter and an index of the second power parameter, and if one of the index of the first power parameter and the index of the second power parameter is known, the other one may be calculated by using the relational expression. For example, the correspondence may alternatively be a table of correspondences between the indexes of the first power parameter and the indexes of the second power parameter, where values of the indexes of the first power parameter and the indexes of the second power parameter correspond to each other. If the first information indicates one of the index of the first power parameter and the index of the second power parameter, the other one may be obtained by looking up the table.

It may be understood that when the first information indicates at least two types of parameters, for example, when both an MCS and a power parameter are indicated, the first information may indicate the first MCS and the first power parameter, but does not indicate the second MCS and the second power parameter; or the first information may indicate the second MCS and the second power parameter, but does not indicate the first MCS and the first power parameter; or the first information may further indicate the first MCS and the second power parameter, but does not indicate the second MCS and the first power parameter; or the first information may further indicate the second MCS and the first power parameter, but does not indicate the first MCS and the second power parameter. All the foregoing descriptions may be understood as that the first information indicates the first transmission parameter or the second transmission parameter. In other words, for a same type of transmission parameters corresponding to different types of transmission resources of a same user, if the first information indicates only a transmission parameter corresponding to one of the transmission resources, but does not indicate a transmission parameter corresponding to another transmission resource, it may be understood that the first information indicates the first transmission parameter or the second transmission parameter.

In the present disclosure, the first information indicates only one of the first transmission parameter or the second transmission parameter, and only one piece of DCI may be used while an existing DCI format is not changed. A receive end may determine, based on a transmission parameter indicated by the DCI and the correspondence between the two transmission parameters, a transmission parameter that is in the two transmission parameters and that is not indicated by the DCI.

In an embodiment, the control information further includes second information, and the second information is used to indicate the allocated first-type transmission resource and the allocated second-type transmission resource.

Figure 4:
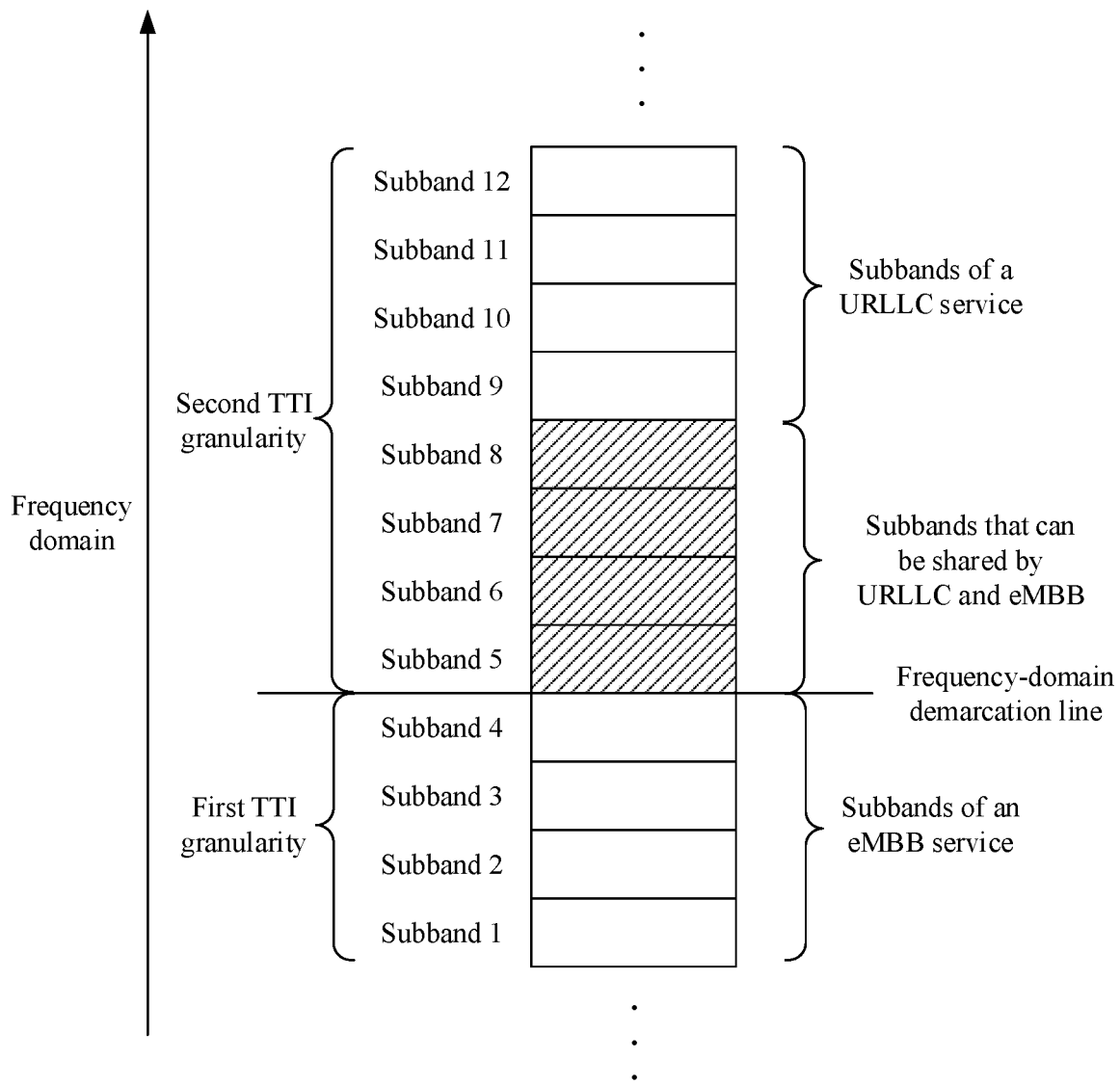
FIG. 4 is a schematic diagram of subband division in frequency domain according to an embodiment of the present disclosure.

The first-type transmission resource and the second-type transmission resource occupy different frequency resources. In an embodiment, as shown in FIG. 4, for division in frequency domain, the network side device may configure three types of subbands. The first type of subband is a subband specially used for the URLLC service, for example, subbands 9 to 12 in FIG. 4; the second type of subband is a subband specially used for the eMBB service, for example, subbands 1 to 4 in FIG. 4; and the third type of subband is a subband that can be shared by the URLLC service and the eMBB service and that is located between the foregoing two types of subbands, for example, subbands 5 to 8 in FIG. 4. It may be understood that FIG. 4 is merely an example, and does not constitute a unique limitation on the present disclosure. During actual division, another form may also be used.

A TTI granularity of the subband that can be shared by the URLLC service and the eMBB service is a second TTI granularity. The subbands that may be allocated by the network side device to the eMBB service are the subbands 1 to 8. In an embodiment, the network side device may allocate a subband corresponding to only a first TTI granularity to the eMBB service, for example, the subbands 1 to 4. In another embodiment, the network side device may further allocate subbands corresponding to both the first TTI granularity and the second TTI granularity to the eMBB service, for example, the subbands 1 to 6, or the subbands 2, 3, 6, and 7.

In an embodiment, when a frequency domain resource in the allocated first-type transmission resource is adjacent to a frequency domain resource in the allocated second-type transmission resource, the second information is specifically used to indicate a start position of total frequency domain resources corresponding to the two types of transmission resources and a quantity of the total frequency domain resources. For example, the frequency domain resource in the allocated first-type transmission resource may be the subbands 3 and 4 in FIG. 4, and the frequency domain resource in the allocated second-type transmission resource may be the subbands 5 and 6 in FIG. 4. In this case, it may be considered that the frequency domain resource in the allocated first-type transmission resource is adjacent to the frequency domain resource in the allocated second-type transmission resource. In this case, the second information may indicate the subband 3 (which is considered as the start position) and a quantity of the subbands, and the quantity of the subbands is 4. Alternatively, the allocated subbands are the subbands 1 to 6. In this case, it may also be considered that the frequency domain resource in the allocated first-type transmission resource is adjacent to the frequency domain resource in the allocated second-type transmission resource. In this case, the second information may indicate the subband 6 and a quantity of the subbands, which is 6. It may be understood that the network side device and the terminal device may agree on a direction of other allocated subbands that are determined based on the start position of the subbands. For example, the second information indicates the subband 6, and the network side device and the terminal device may agree that six subbands are sequentially traversed downward in a direction shown in FIG. 4, thereby determining the allocated subbands. According to this embodiment, the overheads of the control information can be further reduced.

In another embodiment, when the frequency domain resource in the allocated first-type transmission resource is adjacent to the frequency domain resource in the allocated second-type transmission resource, the second information is specifically used to indicate a start position and an end position of total frequency domain resources corresponding to the two types of transmission resources. For example, if the allocated subbands are the subbands 3 to 6, the second information may indicate the subbands 3 and 6. Alternatively, if the allocated subbands are the subbands 1 to 7, the second information may indicate the subbands 1 and 7. According to this embodiment, the overheads of the control information can be further reduced.

In another embodiment, the frequency domain resource in the allocated first-type transmission resource may alternatively not be adjacent to the frequency domain resource in the allocated second-type transmission resource. For example, the allocated subbands are 2, 3, 6, and 7. In this case, the second information is specifically used to indicate a start position and a quantity of the frequency domain resources in the first-type transmission resource, and a start position and a quantity of the frequency domain resources in the second-type transmission resource. Alternatively, the second information is specifically used to indicate a start position and an end position of the frequency domain resource in the first-type transmission resource, and a start position and an end position of the frequency domain resource in the second-type transmission resource.

The terminal device may learn, in a plurality of manners, of a frequency-domain demarcation position of a frequency domain resource using the first TTI granularity and a frequency domain resource using the second TTI granularity in a communications system.

In an embodiment, the network side device may indicate the demarcation position in group common DCI. The group common DCI may be sent to the terminal device in advance. All terminal devices in an active state in the network side device can receive the group common DCI.

In another embodiment, the network side device may further indicate the demarcation position in radio resource control (RRC) signaling.

In another embodiment, the network side device may further deliver, on a broadcast channel, information indicating the demarcation position.

Therefore, the terminal device may learn, based on the second information, of the total frequency domain resources corresponding to the two types of transmission resources, and the terminal device may further learn of the frequency-domain demarcation position of the two types of resources, so that a terminal may determine the frequency domain resource in the first-type transmission resource and the frequency domain resource in the second-type transmission resource.

In another embodiment, the second information may further include two fields. One field indicates the frequency domain resource in the first-type transmission resource, and the other field indicates the frequency domain resource in the second-type transmission resource.

The network side device may configure not only one type of transmission resource for the terminal device, but also two types of transmission resources for the terminal. The terminal device may determine, based on a control message that is for configuring a transmission resource and that is delivered by the network side device, whether one type of transmission resource or two types of transmission resources are configured. Only when determining that two types of transmission resources are configured by the network side device, the terminal device can determine, based on the correspondence and a transmission parameter that is indicated by the control information and that corresponds to one type of transmission resource, a transmission parameter corresponds to the other type of transmission resource. When determining that one type of transmission resource is configured by the network side device, the terminal device may directly determine the transmission parameter indicated by the first information in the control information as the transmission parameter corresponding to the transmission resource configured by the network side device.

In an embodiment, based on the foregoing description, the terminal device determines, based on the frequency-domain demarcation position of the first-type transmission resource and the second-type transmission resource and the frequency domain resources indicated in the second information, that the allocated transmission resources span the frequency-domain demarcation position of the first-type transmission resource and the second-type transmission resource, thereby determining that the network side device has configured transmission resources corresponding to two types of TTI granularities for the terminal device, and further determining that a transmission parameter indicated by the first information corresponds to one type of transmission resource. A transmission parameter corresponding to the other type of transmission resource is determined based on the transmission parameter indicated by the first information and the correspondence. In this embodiment, no additional information needs to be added to indicate when the network side device configures the two types of transmission resources, and the terminal device may perform automatic identification, thereby further reducing the overheads of the control information.

In another embodiment, an existing field (for example, a reserved field), a field shared with other information, or a newly added field in the control information (for example, the DCI) may further indicate that the first transmission parameter or the second transmission parameter that is not indicated by the first information needs to be determined based on the first information in a current control message. After receiving the control information, when determining that such an indication exists in the control message, the terminal device determines, based on a transmission parameter indicated by the first information in the control information and a pre-stored mapping relationship met by the first transmission parameter and the second transmission parameter, the transmission parameter that is in the first transmission parameter and the second transmission parameter and that is not indicated by the first information. For example, the existing field, the shared field, or the newly added field may have two values. One value indicates that the terminal device needs to determine, based on the first information in the current control message, the transmission parameter that is in the first transmission parameter and the second transmission parameter and that is not indicated by the first information; and the other value indicates that the terminal device does not need to determine another transmission parameter, and may directly use the transmission parameter in the control message for data transmission. In this embodiment, the terminal device parses the foregoing field only when a base station instructs, by using higher layer signaling, the terminal device to parse the existing field, the shared field, or the newly added field. Alternatively, the terminal device may parse the existing field, the shared field, or the newly added field each time the DCI is parsed.

In another embodiment, the terminal device may further distinguish, by using different control information (for example, the DCI) formats, whether the current control information is used to configure a transmission parameter corresponding to one type of transmission resource or transmission parameters corresponding to two types of transmission resources. For example, there may be two DCI formats. When the network side device configures only one type of transmission resource for the terminal device, the first DCI format is used; and when the network side device configures two types of transmission resources for the terminal device, the second DCI format is used.

Whether the transmission parameter indicated by the first information is the first transmission parameter corresponding to the first-type transmission resource or the second transmission parameter corresponding to the second-type transmission resource may be agreed on by the terminal device and the network side device in advance, or may be specified in a standard, or may be additionally indicated by using another field in the DCI.

Figure 5:
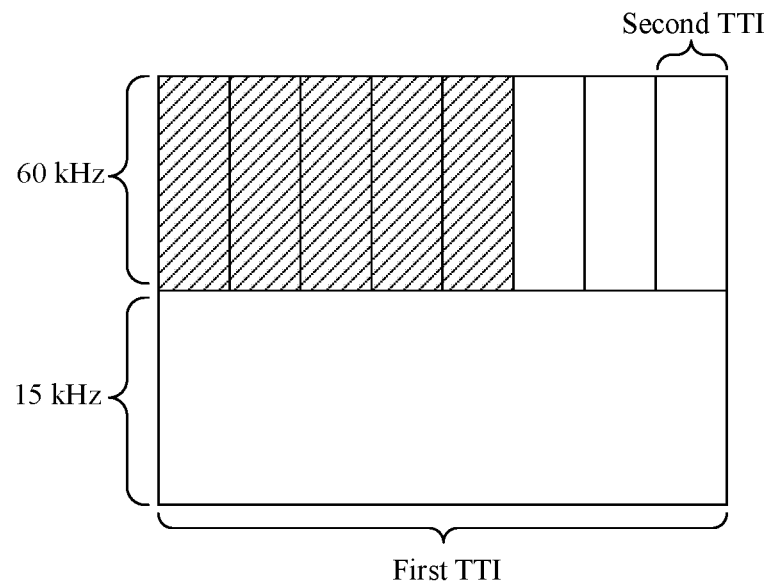
FIG. 5 is an example schematic diagram of resources corresponding to two types of TTIs according to an embodiment of the present disclosure.

In an embodiment, the first TTI is greater than the second TTI, and a time domain resource in the second-type transmission resource is a subset of at least one time domain resource in the first-type transmission resource. As shown in FIG. 5, the second-type transmission resource uses the second TTI as a unit, and the first-type transmission resource uses the first TTI as a unit. Each first TTI corresponds to eight second TTIs, but not all of the eight second TTIs are used to transmit data, and some of the second TTIs may be used to transmit data. Therefore, the time domain resource in the second-type transmission resource may be a time domain resource corresponding to at least one second TTI, for example, may be two second TTIs, three second TTIs, or eight second TTIs. As shown in FIG. 5, the first five second TTIs are used to transmit data of an eMBB service user. Therefore, the time domain resource in the second-type transmission resource is a time domain resource corresponding to the first five second TTIs. The time domain resource in the first-type transmission resource is a time domain resource corresponding to the first TTI.

Further, in an embodiment, the control information further includes third information, and the third information is used to indicate a quantity of second TTIs corresponding to the second-type transmission resource allocated in one first TTI; and the preset correspondence includes a correspondence between the first transmission parameter, the second transmission parameter, and the quantity of the second TTIs.

Therefore, the overheads of the control information required for scheduling by using the second TTI can be further reduced.

In an embodiment, the correspondence between the first transmission parameter, the second transmission parameter, and the quantity of the second TTIs may be specifically a relational expression or a table of correspondences.

Specifically, in an embodiment, the correspondence between the first transmission parameter, the second transmission parameter, and the quantity of the second TTIs may be specifically a correspondence between the index of the first transmission parameter, the index of the second transmission parameter, and the quantity of the second TTIs.

Alternatively, in another embodiment, the correspondence between the first transmission parameter, the second transmission parameter, and the quantity of the second TTIs may be further specifically a correspondence between the index of the first transmission parameter, the index of the second transmission parameter, and an index increment X. The index increment X is determined based on the quantity of the second TTIs. For example, the index increment X and the quantity of the second TTIs may also meet a preset correspondence (which may be a table of correspondences or a relational expression). A correspondence between an index Index1 of the first transmission parameter, an index Index2 of the second transmission parameter, and the index increment X may be, for example, Index2=Index1+X. The index increment X and the quantity of the second TTIs may meet, for example, the following Table 1.

TABLE 1

| Quantity of second TTIs | | | | |
|---|---|---|---|---|
| 1 | 2 | 3 | ... | 8 |
| X | 0 | 0 | 1 | ... | 2 |

In an embodiment, the control information may specifically indicate the first transmission parameter and the quantity of the second TTIs. When the network side device allocates only the first-type transmission resource to the terminal device, the control information also needs to indicate the first transmission parameter. When the network side device allocates two types of transmission resources to the terminal device, the control information still indicates the first transmission parameter. For the terminal device, the received control information slightly changes, so that it is more convenient to parse the control information.

Alternatively, in another embodiment, the control information may specifically indicate the second transmission parameter and the quantity of the second TTIs.

In this embodiment, the control information indicates one of the first transmission parameter and the second transmission parameter, and further indicates the quantity of the second TTIs. In this indication manner, only one piece of control information may be required to complete the indication without changing an existing control information format, thereby effectively reducing overheads of a control channel.

In addition, in another embodiment, the first information may indicate both the first transmission parameter and the second transmission parameter, but does not indicate the quantity of the second TTIs used for transmitting data. The first transmission parameter, the second transmission parameter, and the quantity of the second TTIs meet a preset correspondence. Therefore, the quantity of the second TTIs may be determined based on the first transmission parameter and the second transmission parameter.

In addition, in another embodiment, in addition to the correspondence between the first transmission parameter and the second transmission parameter, the preset correspondence may further include a correspondence between one of the first transmission parameter and the second transmission parameter, and the quantity of the second TTIs. Therefore, the control information may indicate only one of the first transmission parameter and the second transmission parameter, that is, the quantity of the second TTIs and a transmission parameter that is not indicated can be determined based on the foregoing two correspondences. This further reduces the overheads of the control channel. Alternatively, the control information may further indicate only the quantity of the second TTIs, that is, two transmission parameters may be determined based on the foregoing two correspondences.

In addition, in another embodiment, the preset correspondence includes only the correspondence between the first transmission parameter and the second transmission parameter, and the quantity of the second TTIs is indicated by using the third information.

In an embodiment, the quantity of the second TTIs is greater than or equal to 1 and is less than or equal to a quantity of second TTIs corresponding to each first TTI. As shown in FIG. 5, if each first TTI corresponds to eight second TTIs, the quantity of the second TTIs indicated by the third information may be greater than or equal to 1 and less than or equal to 8. In FIG. 5, the quantity of the second TTIs indicated by the third information is 5.

Based on the foregoing description, the quantity of second TTIs corresponding to the second-type transmission resource is indicated by the control information. In other words, the terminal device may learn of the quantity of the second TTIs that are allocated in the first TTI and that are occupied when the terminal device transmits data by using the second-type transmission resource. However, if the quantity of the second TTIs is less than the quantity of the second TTIs corresponding to each first TTI, the terminal device further needs to learn of specific second TTIs that correspond to one first TTI and by using which data is transmitted. In other words, the terminal device needs to know a position of each second TTI used to transmit data.

In an embodiment, the position of the second TTI used to transmit data may be default. For example, the terminal device may consider that the position starts from the first second TTI by default, and the second TTIs used to transmit data are consecutive. As shown in FIG. 5, assuming that the third information indicates five second TTIs, the second TTIs that can be used to transmit data are the first five second TTIs from the beginning. Alternatively, the second TTIs used to transmit data may be inconsecutive. For example, the second TTIs used to transmit data may be the $1^{st}$ second TTI, the $2^{nd}$ second TTI, the $4^{th}$ second TTI, the $6^{th}$ second TTI, and the $7^{th}$ second TTI.

In another embodiment, the position of the second TTI used to transmit data may alternatively be indicated by using the control information. For example, the control information may indicate a start position or an end position of the second TTIs used to transmit data.

In an embodiment, data may be transmitted on the allocated second-type transmission resource in a TTI bundling manner. In a TTI bundling technology, a data packet is repeatedly transmitted or is regularly transmitted on a plurality of consecutive TTI resources, and a receive end combines data on the plurality of TTI resources, to improve transmission quality. A TTI bundling quantity is a quantity of TTIs corresponding to the plurality of consecutive TTI resources. The quantity of the second TTIs is specifically a corresponding TTI bundling quantity when data is transmitted in a slot bundling manner. A plurality of second TTIs that are bundled together in the slot bundling manner are referred to as a TTI bundling block below. A quantity of second TTIs included in each TTI bundling block is the TTI bundling quantity. As shown in FIG. 5, the first five second TTIs form one TTI bundling block, and a TTI bundling quantity corresponding to the TTI bundling block is 5.

In an embodiment, a quantity of second TTI bundling blocks corresponding to each first TTI may be default. For example, there may be one or more second TTI bundling blocks by default. A position of the TTI bundling block may be default, or the control information may further indicate the position of the TTI bundling block.

Figure 6:
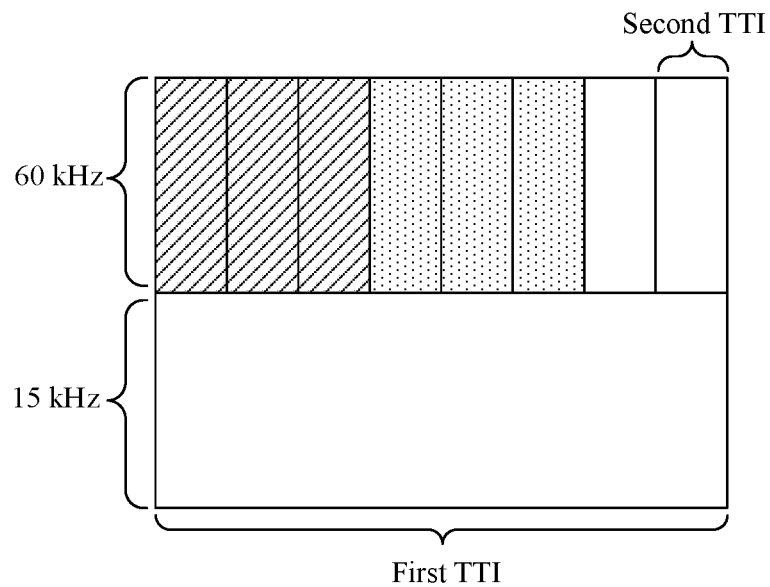
FIG. 6 is another example schematic diagram of resources corresponding to two types of TTIs according to an embodiment of the present disclosure.

In another embodiment, a quantity of TTI bundling blocks may be obtained by rounding down a ratio of a quantity of second TTIs corresponding to one first TTI to a TTI bundling quantity. As shown in FIG. 6, it is assumed that the TTI bundling quantity is 3, and the quantity of second TTIs is 8. In this case, the quantity of TTI bundling blocks is obtained by rounding down a ratio of 8 to 2, that is, 4. In one embodiment, a position of each TTI bundling block may be default. For example, as shown in FIG. 5, the TTI bundling blocks may be sequentially arranged backward from the first second TTI. Alternatively, the control information may further indicate a position of each TTI bundling block.

In an embodiment, the control information further includes fourth information, and the fourth information is used to indicate a transmission mode that needs to be used when data is transmitted on the second-type transmission resource.

For example, the transmission mode may be that a same transport block (TB) is repeatedly sent. TBs that are repeatedly sent may use a same redundancy version (RV) or different redundancy versions, and the TBs that are repeatedly sent may use a same MCS.

For example, the transmission mode may alternatively be that a combination of different code blocks (CB) of a same TB is sent. Each CB may be repeated to some extent. Repeated CBs may use a same RV or different RVs, or CBs may not be repeated and are sequentially sent in a preset sequence. The CBs use a same MCS.

For example, the transmission mode may alternatively be that a combination of different TBs is sent. Each TB may be repeated to some extent. Repeated TBs may use a same RV or different RVs, and the TBs use a same MCS.

When the repeated TBs or CBs use different RVs, a transmission parameter may further include an RV transition rule corresponding to the TTI bundling quantity. The RV transition rule may be indicated by using the control information, or may be agreed on in advance by the network side device and the terminal device. When the RV transition rule is indicated by using the control information, a mapping relationship between the TTI bundling quantity and the RV transition rule may be established, and each mapping relationship corresponds to an index number, so that the control information needs to indicate only the index number.

In an embodiment, the fourth information may specifically indicate an index of the transmission mode. Assuming that a quantity of transmission modes that can be selected is M, a quantity of bits that indicate the transmission mode is obtained by rounding $\log_2(M)$. For example, assuming that there are four transmission modes, two bits may be used to indicate the transmission modes, and the four transmission modes may be respectively indicated by using 00, 01, 10, and 11.

In an embodiment, the control information may further indicate the RV.

In an embodiment, when the terminal device transmits data by using the first-type transmission resource and the second-type transmission resource, the terminal device maps a modulation symbol to a physical resource on the first-type transmission resource and the second-type transmission resource separately. Data transmitted on the first-type transmission resource may be the same as or different from data transmitted on the second-type transmission resource. The data transmitted on the first-type transmission resource and the data transmitted on the second-type transmission resource may be a same TB or different TBs, or may be different CBs or a same CB of a same TB. For example, the TB transmitted on the first-type transmission resource may be different from or the same as the TB transmitted on the second-type transmission resource. Alternatively, the CB transmitted on the first-type transmission resource may be different from the CB transmitted on the second-type transmission resource, or the CBs transmitted on the first-type transmission resource and the CBs transmitted on the second-type transmission resource may alternatively partially overlap, and the CBs transmitted on the two types of resources may belong to a same TB.

According to the parameter configuration method provided in this embodiment of the present disclosure, the network side device sends the control information to the terminal device. The control information indicates only one of the first transmission parameter and the second transmission parameter, and the first transmission parameter and the second transmission parameter meet the preset correspondence, so that after receiving the control information, the terminal device can determine, based on the preset correspondence and a transmission parameter that is indicated by the control information, the first transmission parameter or the second transmission parameter that is not indicated. Therefore, the overheads of the control channel are effectively reduced.

Figure 7:
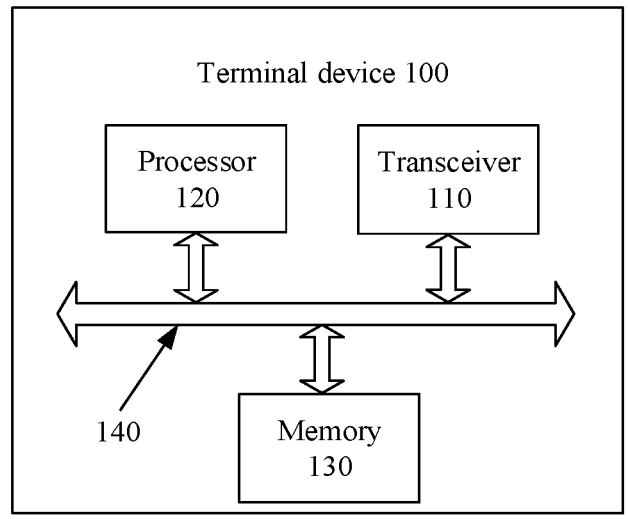
FIG. 7 is an example schematic diagram of a hardware structure of a terminal device according to an embodiment of the present disclosure.

The present disclosure further provides a terminal device 100 according to the foregoing embodiments. As shown in FIG. 7, the terminal device 100 includes a transceiver 110 and a processor 120, and the transceiver 110 is connected to the processor 120. In one embodiment, the terminal device 100 further includes a memory 130. The memory 130 is connected to the processor 120 and the transceiver 110. Further, in one embodiment, the terminal device 100 further includes a bus system 140. The processor 120, the transceiver 110, and the memory 130 are connected to each other by using the bus system 140. The memory 130 may be configured to store an instruction, and the processor 120 is configured to execute the instruction stored in the memory 130, to control the transceiver 110 to receive and send a signal. The memory 130 may be further configured to cache data generated when the processor 120 executes the instruction.

The transceiver 120 is configured to receive control information, where the control information includes first information, the first information is used to indicate a first transmission parameter, and the first transmission parameter is a transmission parameter that needs to be used by the terminal device to perform communication on an allocated first-type transmission resource.

The processor 120 is configured to determine a second transmission parameter based on a pre-stored correspondence met by the first transmission parameter and the second transmission parameter and the first transmission parameter indicated by the first information, where the second transmission parameter is a transmission parameter that needs to be used by the terminal device to perform communication on the second-type transmission resource, and a transmission time interval TTI corresponding to the first-type transmission resource is different from a TTI corresponding to the second-type transmission resource.

In this embodiment, the correspondence met by the first transmission parameter and the second transmission parameter may be pre-stored in the memory 130.

It can be learned from the foregoing embodiment that the terminal device 100 shown in FIG. 7 performs operations S103 and S104 in the embodiment shown in FIG. 3. Specifically, the transceiver 110 performs operation S103 in the embodiment shown in FIG. 3. The processor 120 performs operation S104 in the embodiment shown in FIG. 3. For more details when the transceiver 110 and the processor 120 perform the foregoing operations, refer to the related descriptions in the embodiment shown in FIG. 3. Details are not described herein again.

In this embodiment of the present disclosure, after the terminal device 100 receives the control information sent by a network side device, because the control information indicates the first transmission parameter, and the first transmission parameter and the second transmission parameter meet the preset correspondence, the terminal device can determine the second transmission parameter based on the preset correspondence and the first transmission parameter indicated by the control information. Therefore, overheads of the control information are effectively reduced.

For other functions of the processor 120 and the transceiver 110, refer to descriptions of corresponding embodiments in the foregoing parameter configuration method. Details are not described herein again.

Figure 8:
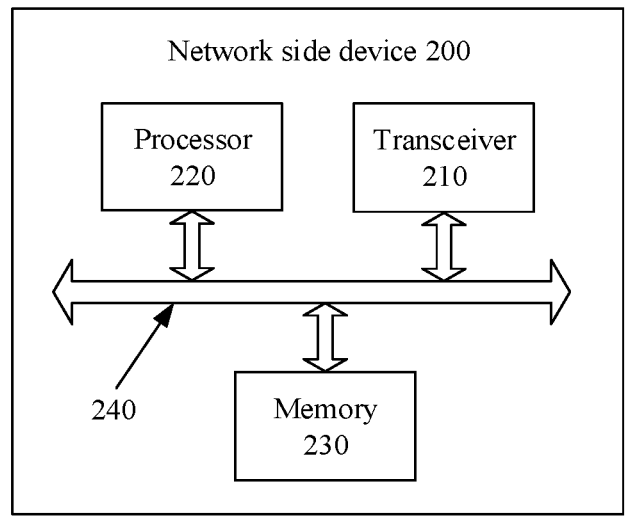
FIG. 8 is an example schematic diagram of a hardware structure of a network side device according to another embodiment of the present disclosure.

The present disclosure further provides a network side device 200 according to the foregoing embodiments. As shown in FIG. 8, the network side device 200 includes a transceiver 210 and a processor 220, and the transceiver 210 is connected to the processor 220. In one embodiment, the network side device 200 further includes a memory 230. The memory 230 is connected to the processor 220 and the transceiver 210. Further, in one embodiment, the network side device 200 further includes a bus system 240. The processor 220, the transceiver 210, and the memory 230 are connected to each other by using the bus system 240. The memory 240 may be configured to store an instruction, and the processor 220 is configured to execute the instruction stored in the memory 240, to control the transceiver 210 to receive and send a signal. The memory 240 may be further configured to cache data generated when the processor 220 executes the instruction.

The processor 220 is configured to determine a first transmission parameter and a second transmission parameter for a terminal device when needing to allocate a first-type transmission resource and a second-type transmission resource to the terminal device, where a transmission time interval TTI corresponding to the first-type transmission resource is different from a TTI corresponding to the second-type transmission resource, the first transmission parameter is a transmission parameter that needs to be used by the terminal device to perform communication on the first-type transmission resource, and the second transmission parameter is a transmission parameter that needs to be used by the terminal device to perform communication on the second-type transmission resource; and the first transmission parameter and the second transmission parameter meet a preset correspondence. The preset correspondence met by the first transmission parameter and the second transmission parameter may be stored in the memory 230.

The processor 220 is further configured to generate control information, where the control information includes first information, and the first information is used to indicate the first transmission parameter or the second transmission parameter.

The transceiver 210 is configured to send the control information.

It can be learned from the foregoing embodiment that the network side device 200 shown in FIG. 8 performs operation S100, operation S101, and operation S102 in the embodiment shown in FIG. 3. Specifically, the transceiver 210 performs operation S102 in the embodiment shown in FIG. 3. The processor 220 performs operation S100 and operation S101 in the embodiment shown in FIG. 3. For more details when the transceiver 210 and the processor 220 perform the foregoing operations, refer to the related descriptions in the embodiment shown in FIG. 3. Details are not described herein again.

In this embodiment of the present disclosure, the network side device 200 sends the control information to the terminal device. The control information indicates only one of the first transmission parameter and the second transmission parameter, and the first transmission parameter and the second transmission parameter meet the preset correspondence, so that after receiving the control information, the terminal device can determine, based on the preset correspondence and a transmission parameter that is indicated by the control information, the first transmission parameter or the second transmission parameter that is not indicated. Therefore, overheads of a control channel are effectively reduced.

For other functions of the processor 220 and the transceiver 210, refer to descriptions of corresponding embodiments in the foregoing parameter configuration method. Details are not described herein again.

The present disclosure further provides a data transmission system. The data transmission system includes the terminal device 100 and the network side device 200 described in the foregoing embodiments. For details, refer to the foregoing embodiments. Details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

To sum up, the foregoing descriptions are merely embodiments of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A terminal device, wherein the terminal device comprises a processor and a transceiver, wherein
the transceiver is configured to receive control information, wherein the control information comprises first information and second information, the first information is used to indicate a first transmission parameter, and the first transmission parameter is a transmission parameter that needs to be used by the terminal device to perform communication on an allocated first-type transmission resource; and
the processor is configured to determine a second transmission parameter based on a preset correspondence met by the first transmission parameter and the second transmission parameter and the first transmission parameter indicated by the first information, wherein the second transmission parameter is a transmission parameter that needs to be used by the terminal device to perform communication on an allocated second-type transmission resource, and a transmission time interval (TTI) corresponding to the first-type transmission resource is different from a TTI corresponding to the second-type transmission resource,
wherein when a frequency domain resource in the allocated first-type transmission resource is adjacent to a frequency domain resource in the allocated second-type transmission resource, the second information is used to indicate a start position of total frequency domain resources corresponding to the first-type and second-type transmission resources and a quantity of the total frequency domain resources; or the second information is used to indicate at least one of a start position or an end position of the total frequency domain resources corresponding to the first-type and second-type transmission resources.

2. The terminal device according to claim 1, wherein the second information is used to indicate the allocated first-type transmission resource and the allocated second-type transmission resource; and
the processor is further configured to determine the allocated first-type transmission resource and the allocated second-type transmission resource based on the second information.

3. The terminal device according to claim 1, wherein the first transmission parameter comprises a first modulation and coding scheme (MCS), the second transmission parameter comprises a second MCS, and the preset correspondence comprises a correspondence between the first MCS and the second MCS.

4. The terminal device according to claim 1, wherein the first transmission parameter comprises a first power parameter, the second transmission parameter comprises a second power parameter, and the preset correspondence further comprises a correspondence between the first power parameter and the second power parameter.

5. The terminal device according to claim 1, wherein a granularity of the transmission time interval TTI corresponding to the first-type transmission resource is a first TTI, a granularity of the TTI corresponding to the second-type transmission resource is a second TTI, the first TTI is greater than the second TTI, and a time domain resource in the second-type transmission resource is a subset of at least one time domain resource in the first-type transmission resource.

6. The terminal device according to claim 5, wherein the control information further comprises third information, and the third information is used to indicate a quantity of second TTIs corresponding to the second-type transmission resource allocated in one first TTI; and the preset correspondence comprises a correspondence between the first transmission parameter, the second transmission parameter, and the quantity of the second TTIs.

7. The terminal device according to claim 6, wherein the quantity of the second TTIs is a corresponding TTI bundling quantity when data is transmitted in a slot bundling manner.

8. The terminal device according to claim 6, wherein the first information is an index of the first transmission parameter; and correspondingly,
the correspondence between the first transmission parameter, the second transmission parameter, and the quantity of the second TTIs is a correspondence between the index of the first transmission parameter, an index of the second transmission parameter, and the quantity of the second TTIs; or
the correspondence between the first transmission parameter, the second transmission parameter, and the quantity of the second TTIs is a correspondence between the index of the first transmission parameter, an index of the second transmission parameter, and an index increment, wherein the index increment is determined based on the quantity of the second TTIs.

9. The terminal device according to claim 1, wherein the control information further comprises fourth information, and the fourth information is used to indicate a transmission mode that needs to be used when data is transmitted on the second-type transmission resource.

10. A network side device, wherein the network side device comprises a processor and a transceiver, wherein
the processor is configured to determine a first transmission parameter and a second transmission parameter for a terminal device when needing to allocate a first-type transmission resource and a second-type transmission resource to the terminal device, wherein a transmission time interval (TTI) corresponding to the first-type transmission resource is different from a TTI corresponding to the second-type transmission resource, the first transmission parameter is a transmission parameter that needs to be used by the terminal device to perform communication on the first-type transmission resource, and the second transmission parameter is a transmission parameter that needs to be used by the terminal device to perform communication on the second-type transmission resource; and the first transmission parameter and the second transmission parameter meet a preset correspondence;
the processor is further configured to generate control information, wherein the control information comprises first information and second information, and the first information is used to indicate the first transmission parameter; and the transceiver is configured to send the control information, wherein when a frequency domain resource in the allocated first-type transmission resource is adjacent to a frequency domain resource in the allocated second-type transmission resource, the second information is used to indicate a start position of total frequency domain resources corresponding to the first-type and second-type transmission resources and a quantity of the total frequency domain resources; or the second information is used to indicate at least one of a start position or an end position of the total frequency domain resources corresponding to the first-type and second-type transmission resources.

11. The network side device according to claim 10, wherein the second information is used to indicate the allocated first-type transmission resource and the allocated second-type transmission resource.

12. The network side device according to claim 10, wherein the first transmission parameter comprises a first modulation and coding scheme (MCS), the second transmission parameter comprises a second MCS, and the preset correspondence comprises a correspondence between the first MCS and the second MCS.

13. The network side device according to claim 10, wherein the first transmission parameter comprises a first power parameter, the second transmission parameter comprises a second power parameter, and the preset correspondence further comprises a correspondence between the first power parameter and the second power parameter.

14. The network side device according to claim 10, wherein a granularity of the transmission time interval TTI corresponding to the first-type transmission resource is a first TTI, a granularity of the TTI corresponding to the second-type transmission resource is a second TTI, the first TTI is greater than the second TTI, and a time domain resource in the second-type transmission resource is a subset of at least one time domain resource in the first-type transmission resource.

15. The network side device according to claim 14, wherein the control information further comprises third information, and the third information is used to indicate a quantity of second TTIs corresponding to the second-type transmission resource allocated in one first TTI; and the preset correspondence comprises a correspondence between the first transmission parameter, the second transmission parameter, and the quantity of the second TTIs.

16. The network side device according to claim 15, wherein the quantity of the second TTIs is a corresponding TTI bundling quantity when data is transmitted in a slot bundling manner.

17. The network side device according to claim 15, wherein the first information is an index of the first transmission parameter; and correspondingly,
the correspondence between the first transmission parameter, the second transmission parameter, and the quantity of the second TTIs is a correspondence between the index of the first transmission parameter, an index of the second transmission parameter, and the quantity of the second TTIs; or
the correspondence between the first transmission parameter, the second transmission parameter, and the quantity of the second TTIs is a correspondence between the index of the first transmission parameter, an index of the second transmission parameter, and an index increment, wherein the index increment is determined based on the quantity of the second TTIs.

18. The network side device according to claim 10, wherein the control information further comprises fourth information, and the fourth information is used to indicate a transmission mode that needs to be used when data is transmitted on the second-type transmission resource.

* * * * *